Dec. 12, 1939.  E. E. VAN CLEAVE  2,183,417
HOUSING FOR HAND BRAKE MECHANISM
Filed Dec. 14, 1936   5 Sheets-Sheet 3
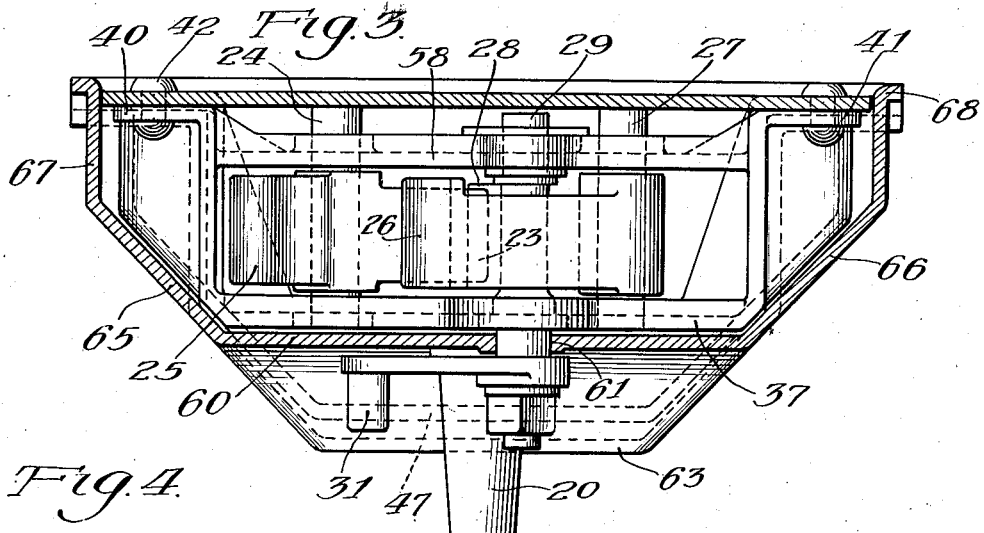
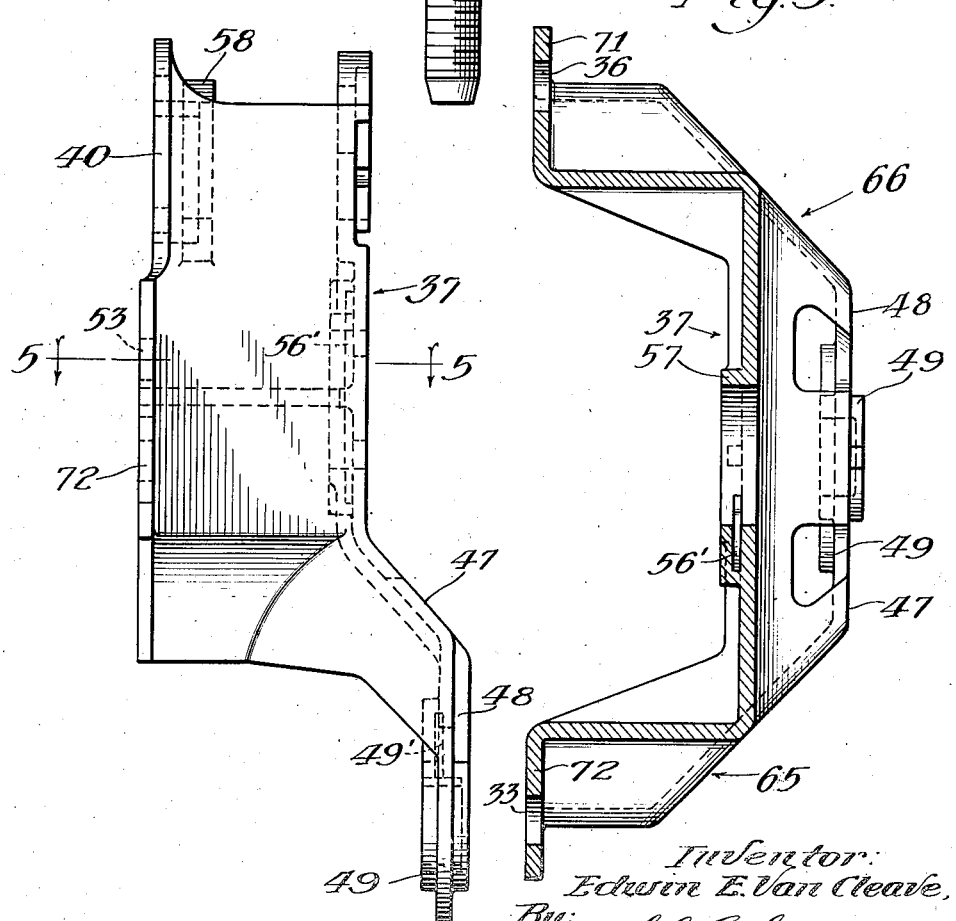

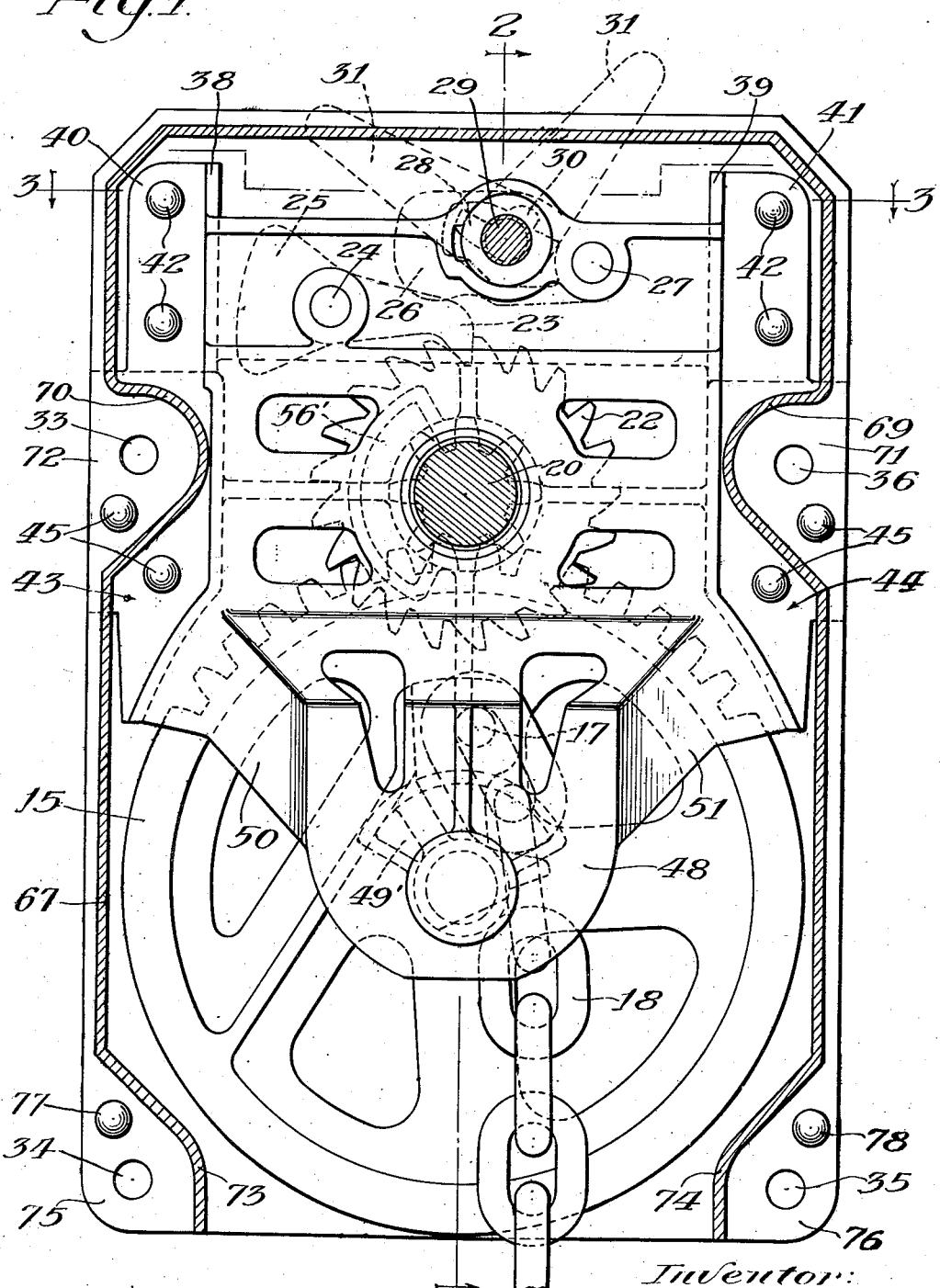

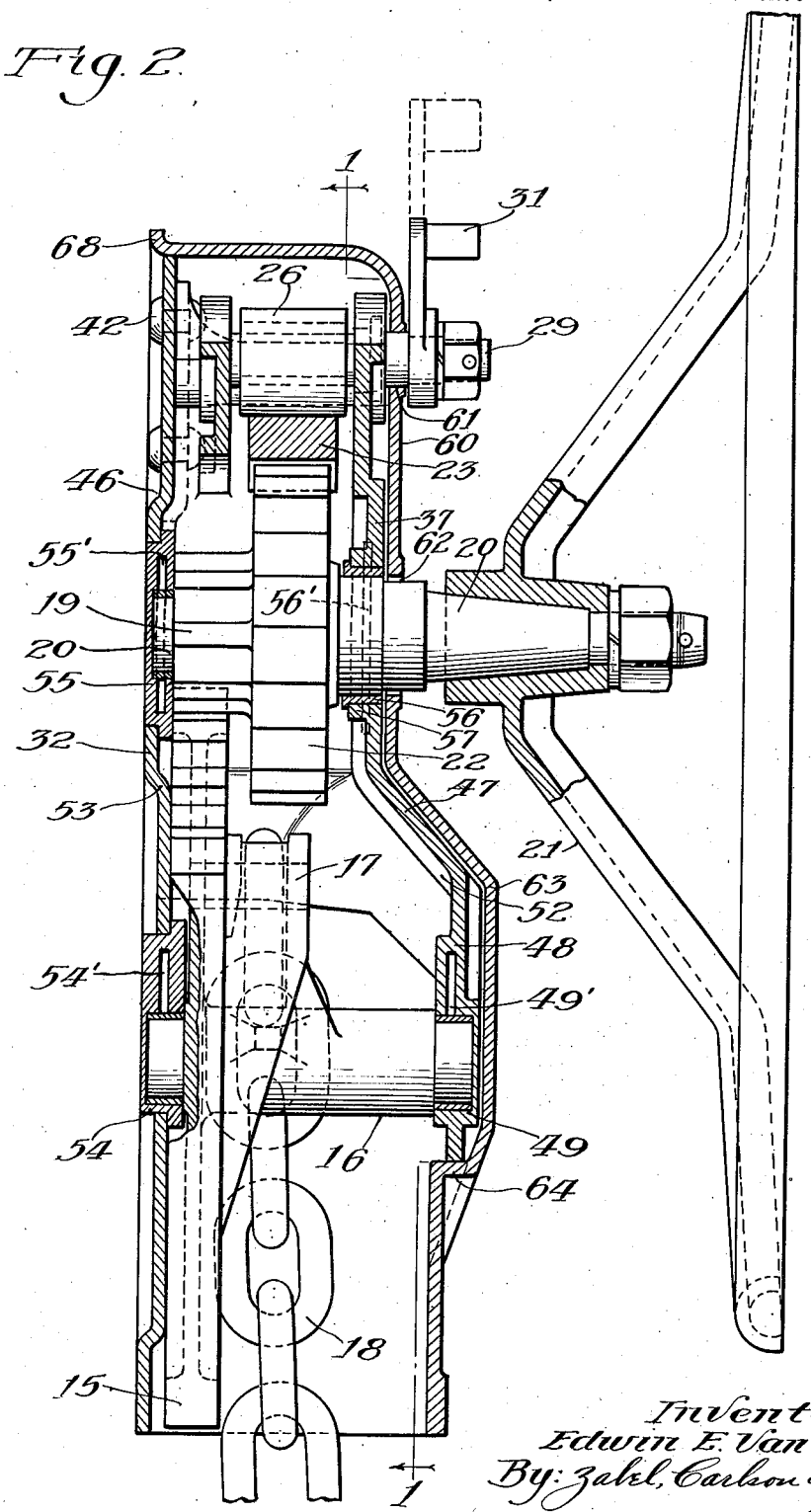

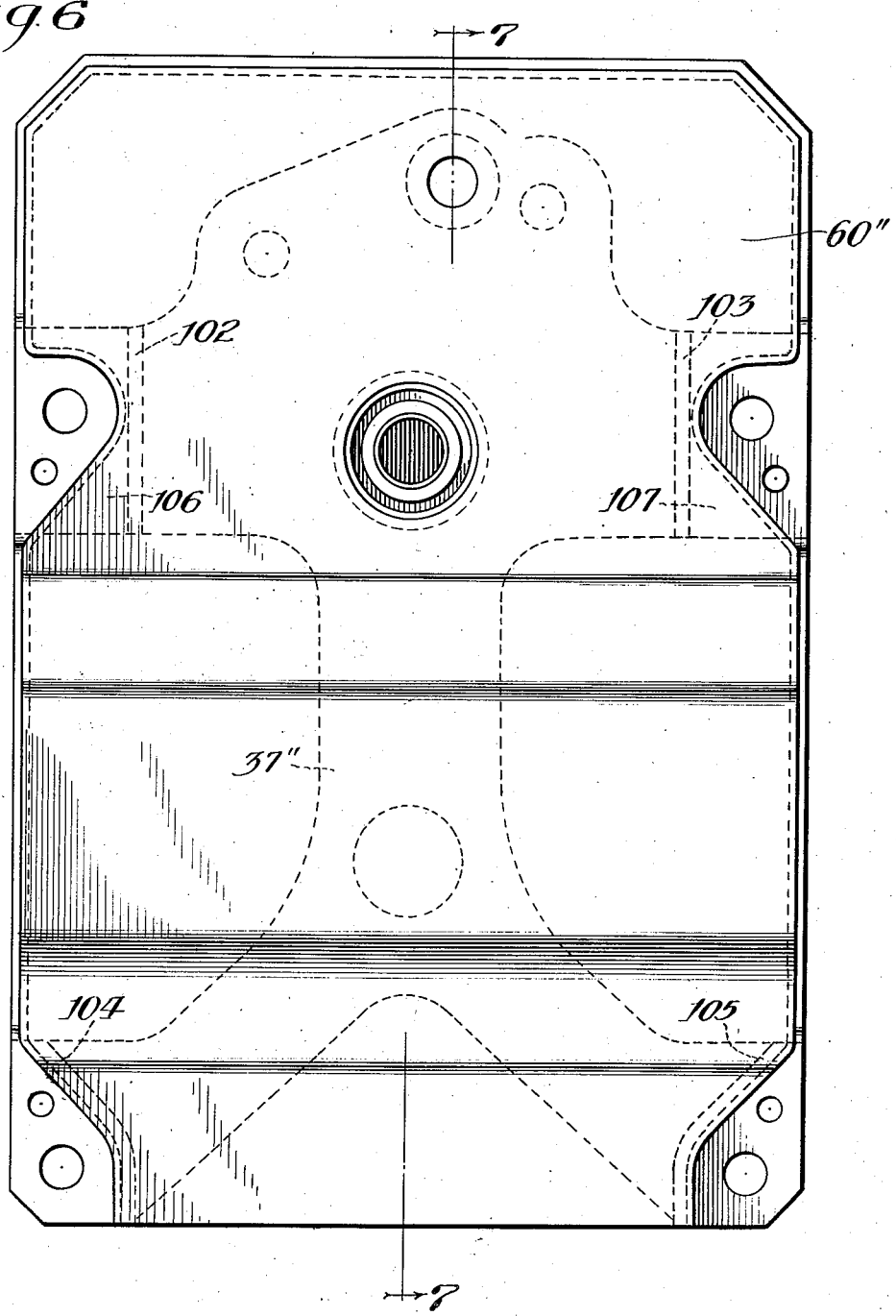

Dec. 12, 1939.  E. E. VAN CLEAVE  2,183,417
HOUSING FOR HAND BRAKE MECHANISM
Filed Dec. 14, 1936   5 Sheets-Sheet 5
Fig. 7  Fig. 8
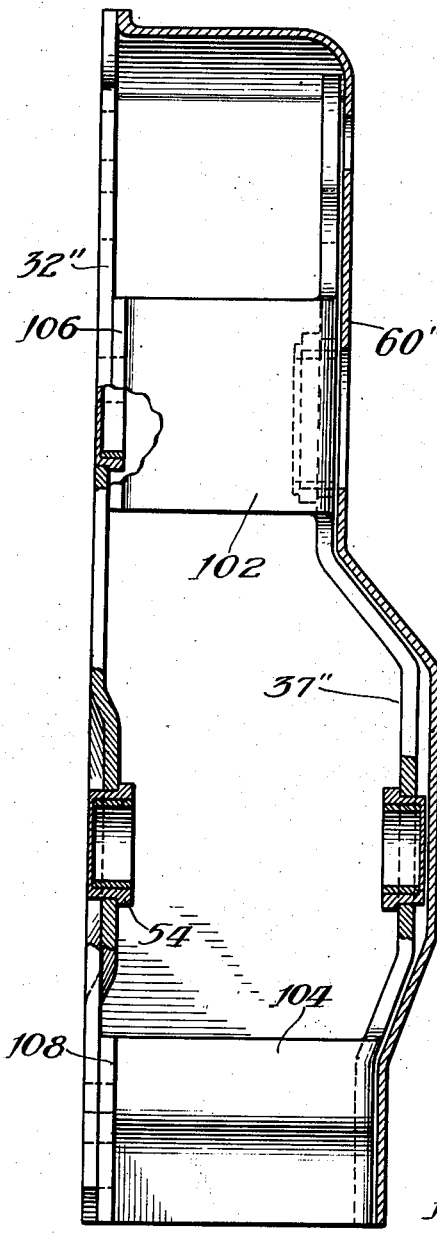
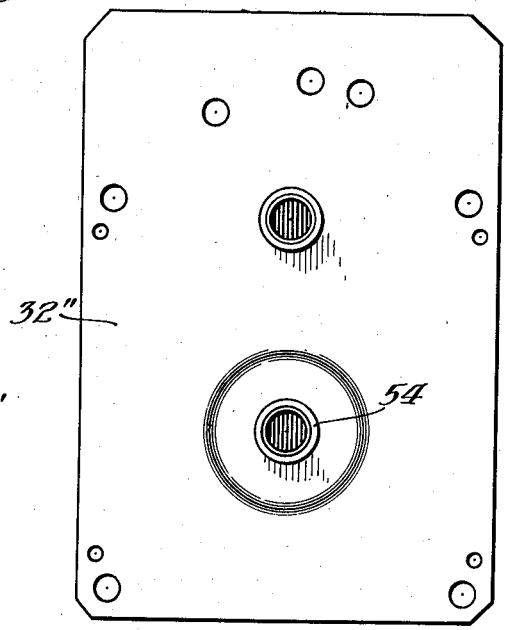
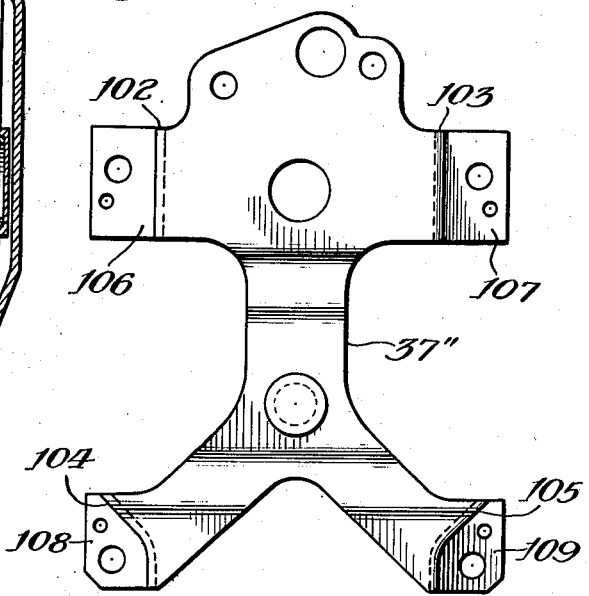
Fig. 9
Inventor:
Edwin E. Van Cleave,
By: Zabel, Carlson & Wells,
Attorneys Patented Dec. 12, 1939

2,183,417

UNITED STATES PATENT OFFICE 2,183,417

HOUSING FOR HAND BRAKE MECHANISM

Edwin E. Van Cleave, Chicago, Ill.

Application December 14, 1936, Serial No. 115,798

13 Claims. (Cl. 74—505)

My invention relates to housing and supporting hand brake winding mechanisms.

The principal object of the invention is to provide, by a novel construction adequate support and protection for the operating parts of a hand brake winding mechanism in such a manner as to facilitate the assembly, and in certain forms the inspection and repair thereof.

The invention is embodied in a hand brake winding mechanism comprising a large gear and a winding sheave, a pinion meshing with said gear and having a shaft to which a hand wheel is attached, this shaft being provided with a ratchet wheel which cooperates with a suitable pawl mechanism to lock the pinion against rotation in one direction. In a brake winding mechanism of this character, the stresses upon the supporting means for the winding sheave are quite high. My invention contemplates the provision of a front frame and a back plate so arranged as to provide ample strength for taking care of the stresses and to provide an open framework in which all of the parts are mounted, with a cover which is so constructed as to house and protect the moving parts. The construction in one embodiment of the invention is such that the cover is free from the stresses or at least substantially so. The cover therefore may be so designed as to most efficiently perform its function of protection while the back plate and front frame may be designed to facilitate the assembly and support of the operating parts in the most efficient manner.

It is a further purpose of my invention to provide in a device of this character a supporting framework comprising a back plate and a front frame of open construction having upper and lower spacing and mounting lugs extending from the front frame rearwardly and fixed to the back plate, the frame and plate being provided with mounting means for shafts to carry the operating parts of the brake winding mechanism.

The features and advantages of the invention will more readily appear from the following description, reference being had to the accompanying drawings wherein certain preferred forms of the invention are shown.

In the drawings—

Fig. 1 is a front elevation with the cover shown in section of a brake winding mechanism embodying the invention;

Fig. 2 is a vertical sectional view taken on the line 2—2 of Fig. 1;

Fig. 3 is a sectional view taken on the line 3—3 of Fig. 1;

Fig. 4 is a view in side elevation of a front frame member employed in the supporting structure for the operating parts of the brake winding mechanism;

Fig. 5 is a sectional view taken on the line 5—5 of Fig. 4;

Fig. 6 is a front elevation of a further form of supporting and housing structure embodying the invention;

Fig. 7 is a sectional view taken on the line 7—7 of Fig. 6;

Fig. 8 is a front elevation of a back plate used in the form shown in Figs. 6 and 7; and Fig. 9 is a front elevation of a front frame used in the form shown in Figs. 6 and 7.

Referring now to the drawings, the invention is shown as embodied in a hand brake winding mechanism of the type disclosed in the application of Carl Naylor, Serial Number 90,368, filed July 15, 1936. This hand brake winding mechanism comprises a gear 15 and a winding sheave 16. The gear 15 and the sheave 16 are a unitary structure and include means 17 for attaching a chain 18 thereto. The winding mechanism further comprises a pinion 18 meshing with the gear 16. This pinion is formed upon a shaft 20 to which an operating hand wheel 21 is secured. A ratchet wheel 22 is fixed upon the shaft 20 and cooperates with a pawl 23 to prevent rotation of the shaft 20 in one direction. The pawl 23 is mounted on a shaft 24. The pawl also carries a counter-weight 25, the normal tendency of which is to hold the pawl away from the ratchet wheel 22. A weighted arm 26 is carried by a shaft 27. The arm 26 is adapted to rest upon the pawl 23 for forcing it into engagement with the ratchet wheel 22. The arm 26 is manually controlled by means of finger 29 upon a shaft 29. The finger 28 operates within an aperture 30 in the weighted arm 26 to either press the arm 26 against the pawl 23 or lift the arm 26 away from the pawl 23. The shaft 29 is operated by a hand lever 31 secured upon the shaft 29. The specific operation of the winding mechanism is more clearly brought out in the application above referred to. Further explanation of this operation is believed to be unnecessary in this application which is directed to improvements in the housing and supporting of the several parts of the mechanism.

The winding mechanism just described is mounted upon the end of a car body by means of a back plate 32 which is provided with apertures at 33, 34, 35, and 36 to receive rivets or bolts for securing it to the car body. A front frame member 37, which is of substantial construction, cooperates with the back plate 32 to support the several parts of the winding mechanism hereinbefore described in their operative positions with respect to each other. The front member 37 at the top has rearwardly extending side portions 38 and 39 adapted to space the front frame member 37 forwardly of the back plate 32. The side portions 38 and 39 have feet 40 and 41 resting upon the back plate 32 and secured thereto by any suitable means such, for example, as rivets 42. The front frame member 37 also has the side portions 38 and 39 extending downwardly past the upper rivet openings 33 and 36 in the back plate 32. Outwardly extending flanges or feet 43 and 44 are formed upon the lower parts of the side portions 38 and 39 and are riveted by means of suitable rivets 45 directly to the back plate 32. There are two rivets 42 and two rivets 45 at each side of the frame member 37. This securely anchors the top of the frame member 37 to the upper part of the back plate 32. It will be noted that the back plate 32 is offset at 46 (see Fig. 2). The feet 40 and 41, therefore, are turned out in a different plane from the feet 43 and 44 so that both sets of feet may fit tightly against the back plate 32. The side portions 38 and 39 cooperate with the two sets of feet to provide upper and lower spacing and supporting portions for mounting the frame member 37 on the back plate 32.

The front frame member 37 is offset outwardly at 47 and then has a downwardly extending portion 48 which is provided with a bearing 49 for the winding sheave 16. For the purpose of imparting rigidity and strength to the depending portion 48 of the front frame 37, this depending portion is connected by flanges 50 and 51 which extend diagonally outwardly and rearwardly to join the flanges 43 and 44. In addition, the offset portion 47 is provided with a reenforcing rib 52 to further strengthen the structure. The flanges 50 and 51 extend outwardly far enough to clear the gear 15 and then extend rearwardly to join the feet 43 and 44.

The back plate 32 is offset toward the front frame at 53 and carries a cup bearing at 54 for supporting the rear end of the unit comprising gear 15 and winding sheave 16. The back plate also carries a cup bearing 55 for the rear end of the shaft 20. The shaft 29 is supported in a bearing 56 provided in a boss 57 of the front frame 37. The bearings 49, 54, 55, and 56 are each provided with a bushing of porous metal such as that sold under the name of Oilite. Oil pockets 49', 54', 55', and 56' are provided in the bearings 49, 54, 55 and 56 respectively, so that the porous bushings act as closures for the oil pockets. The oil in the pockets then continuously feeds oil into the porous bushings as it is needed by the bearings.

The shafts 24, 27, and 29 are all carried by the front frame member 37. Adjacent the upper end of this front frame member the side portions 38 and 39 are connected by a web 58 which is spaced a short distance from the back plate 32. This web 58 and the top portion of the front frame 37 provide front and rear walls having suitable bearings for the three shafts 24, 27, and 29. The entire holding and releasing mechanism is thus carried by the frame member 37 and is not mounted directly on the back plate 32 at any point.

A cover 60 is adapted to rest upon and be secured to the back plate 32. This cover comprises a front portion having apertures 61 and 62 for the shafts 29 and 20, respectively, and having a forwardly offset portion 63 extending down over the depending portion 48 of the frame 37. Where the frame 37 is of a heavy substantial construction, the cover is made light and contributes no support for the operating mechanism. In the event that a lighter frame is used, the cover 60 may desirably be utilized to provide a supplemental support for the depending portion 48 in the following manner. At the lower tip end of the portion 48, the cover 60 is pressed inwardly as indicated at 64 to provide a shelf contacting with the lower edge of the portion 48. The stresses imparted by the load upon the sheave 16 are quite high, and this additional support further fortifies the depending portion 48 against damage under excessive loads.

The cover is bevelled along the vertical side edges as indicated at 65 and 66 so that it closely fits the contours of the front frame member 37. The sides and the top portion of the cover constitute a continuous flange 67 which at the top is extended rearwardly as indicated at 68 so as to overlie the top edge of the back plate 32. At the opposite sides, the flange 67 is curved inwardly at 69 and 70 (see Fig. 1) and is provided with flat portions 71 and 72 overlying the feet 43 and 44 of the front frame member so that the cover may be secured in position by two of the rivets 45 and by the securing means which is applied to the apertures 33 and 36 to secure the back plate to the car body. Adjacent the lower end of the cover, the side flange 67 is curved inwardly at 73 and 74 and is provided with flanges 75 and 76 which rest against the back plate 32 and are secured thereto by rivets 77 and 78. The cover is apertured only at 61 and 62 to permit the shafts 29 and 20 which must project from the brake winding mechanism to pass through it. All of the rest of the brake winding mechanism is completely enclosed within the housing provided by the cover 60 and the back plate 32. The housing, of course, has a restricted outlet at the lower end between the two side portions 73 and 74 which outlet is necessary for the chain 18.

In Figs. 6 to 9, inclusive, I have illustrated a further embodiment of the invention. In this form of the invention, the back plate 32" is a rectangular plate provided with a boss for a cup bearing 54" supporting the rear end of the winding sheave and gear element. In the present form, upper and lower rearwardly extending spacing and supporting legs 102, 103, 104, and 105 are bent from the body of the front frame member 37" which may be a heavy metal stamping. These legs have out turned feet which contain holes for attaching rivets and assembly rivets.

The legs 102, 103, 104, and 105 are provided with outwardly extending feet 106, 107, 108, and 109 which are riveted directly to the back plate 32". A cover 60" which in this form is substantially the same as shown in Figs. 1 to 5, inclusive, is adapted to be secured to the back plate 32" by the same rivets that secure the front frame member 37" in position. The cover 60", since it performs no load carrying function, may be made very light, while the back plate and front frame should be formed from heavy stock capable of withstanding the stresses incidental to normal operation of the brake mechanism.

It will be noted that in the form of the invention shown in Figs. 1–5, the back plate 32 carries a bearing for the winding gear 15 and sheave 16 and a bearing for the shaft 20. The shafts 24, 27, and 29 and the associated tripping mechanism are supported entirely by the front frame 37 and are not secured to the cover or the back plate which together make up the brake housing. The shafts 24 and 27 are slidable endwise in the frame 37 and are held in place by the back plate at one end and the cover at the other end. In the other form of the invention where the back plate is provided with bearings for the shafts 24, 27, and 29, the cover is also used to hold the shafts 24 and 27 in position. The front ends of the shafts 24 and 27 engage the cover and the shafts are prevented from moving away from the back plate. It is obvious that shafts 24, 27, and 29 may be supported solely by the front frame members in the form shown in Figs. 6–9 after the manner shown in Figs. 1–5. The oil pockets shown in connection with Figs. 1–5 also may be applied to the other form.

The construction of the back plate, the front frame, and the cover is such as to maintain low weight with the requisite strength. The open construction of the front frame in all forms of the invention eliminates unnecessary weight without sacrificing strength or rigidity.

While the preferred embodiment of the invention has been shown and described, it is to be understood that it is capable of many modifications. Changes, therefore, in the construction and arrangement may be made without departing from the spirit and scope of the invention as disclosed in the appended claims in which it is the intention to claim all novelty inherent in the invention as broadly as possible in view of the prior art.

Having thus described the invention, what is claimed as new and desired to be secured by Letters Patent is:

1. In a railway car hand brake, a housing and supporting means comprising a back plate member having its sides apertured to receive rivets and the like for securing it to a car body, a front frame member having spacing and supporting portions extending rearwardly and secured to said back plate member, shaft bearings in said members, a front cover plate having a rearwardly extending flange at the sides and top resting on the back plate member, said flange being secured to one of said members.

2. In a railway car hand brake, a housing and supporting means comprising a back plate member having its sides apertured to receive rivets and the like for securing it to a car body, a front frame member having spacing and supporting portions extending rearwardly and secured to said back plate member, shaft bearings in said members, said front frame member having a lower portion offset toward the front from the upper portion, said offset lower portion having one of the shaft bearings therein, a front cover plate having a rearwardly extending flange at the sides and top resting on the back plate member, said flange being secured to one of said members, and said cover having a shoulder beneath the lower offset portion of the frame member providing a support therefor.

3. Means to house and support the operating parts of a hand brake winding mechanism comprising in combination a back plate, a front frame, and a cover, said cover having a front portion overlying the front frame and a flange extending rearwardly over the back plate at the sides and top thereof.

4. Means to house and support the operating parts of a hand brake winding mechanism comprising in combination a back plate, a front frame, and a cover, said cover having a front portion overlying the front frame and a flange extending rearwardly over the back plate at the sides and top thereof, said front frame having the lower portion thereof offset forwardly of the upper portion and rearwardly diverging reenforcing portions extending from said lower portion to the back plate and secured to said back plate.

5. Means to house and support the operating parts of a hand brake winding mechanism comprising in combination a back plate, a front frame, and a cover, said front frame having the lower portion thereof offset forwardly of the upper portion and said front frame having rearwardly diverging reenforcing portions extending from said lower portion to the back plate and secured to said back plate.

6. Means to house and support the operating parts of a hand brake winding mechanism comprising in combination a back plate, a front frame, and a cover, said front frame having rearwardly extending portions at the side edges thereof, said portions being secured to the back plate, said front frame having front and rear walls at the upper portion thereof for mounting the tripping parts of said winding mechanism.

7. In a hand brake winding mechanism, a back plate, a front frame and a cover, the front frame having portions at the side thereof extending rearwardly to the back plate and secured to the back plate to mount the front frame on the back plate and provide a mechanism receiving space between said front frame and the back plate, said frame and said back plate having aligned shaft receiving bearings therein, said front frame having front and rear walls at the upper portion thereof for mounting the tripping parts of said winding mechanism.

8. Means to house and support the operating parts of a hand brake winding mechanism comprising in combination a back plate, a front frame, and a cover, said cover having a front portion overlying the front frame and a flange extending rearwardly to the back plate at the sides and top thereof, said front frame having the lower portion thereof offset forwardly of the upper portion and rearwardly diverging reenforcing portions extending from said lower portion, said reenforcing portions carrying lugs, and means securing said lugs to the back plate.

9. In a hand brake winding mechanism, a back plate, a front frame and a cover, the front frame having portions at the side thereof extending rearwardly to the back plate and secured to the back plate to mount the front frame on the back plate and provide a mechanism receiving space between said front frame and the back plate, said frame and said back plate having aligned shaft receiving bearings therein, and oil pockets in said bearings, opening into the shaft receiving openings in said bearings.

10. Means to house and support the operating parts of a hand brake winding mechanism comprising in combination a back plate, a front frame, and a cover, said cover having a front portion overlying the front frame and a flange extending rearwardly over the back plate at the sides and top thereof, shaft bearings in said plate and frame, and oil pockets carried by said bearings and opening into the shaft receiving openings of said bearings.

11. Means to house and support the operating parts of a hand brake winding mechanism comprising in combination a back plate, a front frame, and a cover, said cover having a front portion overlying the front frame and a flange extending rearwardly over the back plate at the sides and top thereof, said cover having a shoulder beneath the front frame providing a support therefor.

12. In a hand brake winding mechanism, a back plate, a frame, and a cover, said cover being secured to the back plate, and said cover having means beneath the frame providing a support therefor.

13. In a hand brake winding mechanism, a back plate, a frame, and a cover, said cover being secured to the back plate, and said cover having means beneath the frame providing a support therefor, said means comprising an internal shoulder formed on said cover.

EDWIN E. VAN CLEAVE.